(12) United States Patent
Feldman et al.

(10) Patent No.: US 10,713,094 B1
(45) Date of Patent: Jul. 14, 2020

(54) ALLOCATING COMPUTING RESOURCES IN AN ONLINE SYSTEM

(71) Applicant: Facebook, Inc., Menlo Park, CA (US)

(72) Inventors: Matthew Feldman, San Francisco, CA (US); Li Yu, Fremont, CA (US); Wei Yu, Newark, CA (US); Phillip Huang, Menlo Park, CA (US); Haomin Yu, Mountain View, CA (US); Yufei Chen, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 194 days.

(21) Appl. No.: 15/970,841

(22) Filed: May 3, 2018

(51) Int. Cl.
*G06F 9/46* (2006.01)
*G06F 9/50* (2006.01)
*G06Q 30/02* (2012.01)
*G06F 16/487* (2019.01)

(52) U.S. Cl.
CPC .......... *G06F 9/5033* (2013.01); *G06F 16/487* (2019.01); *G06Q 30/0201* (2013.01)

(58) Field of Classification Search
None
See application file for complete search history.

*Primary Examiner* — Gregory A Kessler
(74) *Attorney, Agent, or Firm* — Fenwick & West LLP (57) ABSTRACT

An online system maintains a plurality of content items. The online system selects and provides content items to users of the online system in response to impression opportunities to provide content items to users. A plurality of segments of the impression opportunities are determined. Each segment categorizes the impression opportunities. A relationship between a value metric and computing resources used in the selection process are determined for each segment. Each relationship provides a rate of increase of the value metric given an increase in computing resources used. An allocation of computing resources used per impression opportunity for each of segment is determined based on the rates. A plurality of impression opportunities are identified. In response, one or more content items are selected for each impression opportunity using computing resources according to the determined allocation for the segment to which each impression opportunity belongs.

20 Claims, 5 Drawing Sheets

ALLOCATING COMPUTING RESOURCES IN AN ONLINE SYSTEM

BACKGROUND

This disclosure relates to optimizing computing resource allocation in an online system.

Online systems operate upon computers, which have limited resources, and if all computing resources are being used at once, no additional processing may be performed by that computer until an executing process completes and thereby frees resources. Some processing requires a greater amount of computing resources to perform than others. Furthermore, in an online system, some processing may be more valuable than others. For example, in an online system that runs a selection process that selects content to deliver to a user, the online system may find better content for the user by looking at a larger pool of candidate content and/or by using more sophisticated prediction models. But if the online system delivers content to a large number of users, it has to decide how to employ its computing resources among the selection processes for the different users, who may interact in varying degrees with the content in a way that it beneficial to the online system. It is thus desirable to allocate the computing resources of the online system to maximize the value of actions performed by users who are presented with content selected by the online system.

SUMMARY

An online system maintains a plurality of content items and provides the content items to its users in response to impression opportunities, which is an opportunity to present a user of the system with one or more content items. To use its computing resources efficiently, the system divides the impression opportunities into a plurality of segments. In one example, each of the plurality of impression opportunities is segmented based on one or more characteristics of: the impression opportunity itself, the user associated with the impression opportunity, and/or the content item associated with the impression opportunity. The characteristics used to segment the impression opportunities are chosen so that a rate of increase of the value of the impressions from the impression opportunities are similar given an increase in computing resources used for the impression opportunities. Conversely, a given increase in computing resources used for the impression opportunities in one segment would be expected to result in a different increase in value than the same increase in computing resources used for the impression opportunities of a different segment. For example, the impression opportunities may be segments by a country of origin of the user associated with the impression opportunity, where it is expected that devoting more computing resources to select content for users in one country leads to a greater value than devoting those resources to users in another country.

Once the segments are defined, relationships are determined for each segment between a value metric and computing resources used in the online system's selection of content items for the impression opportunities of the segment. Each relationship provides a rate of increase of the value metric given an increase in computing resources used per impression opportunity. An allocation of computing resources used per impression opportunity for each segment is determined based on the rates of increase. In one example, the allocation is determined such that the rate of increase of the value metric for each of the segment is within a threshold amount of each other. Thereafter, in response to each of a plurality of impression opportunities to provide content to a user of the online system, the online system selects one or more content items for each of the plurality of impression opportunities according to the determined allocation for the segment to which each impression opportunity belongs.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
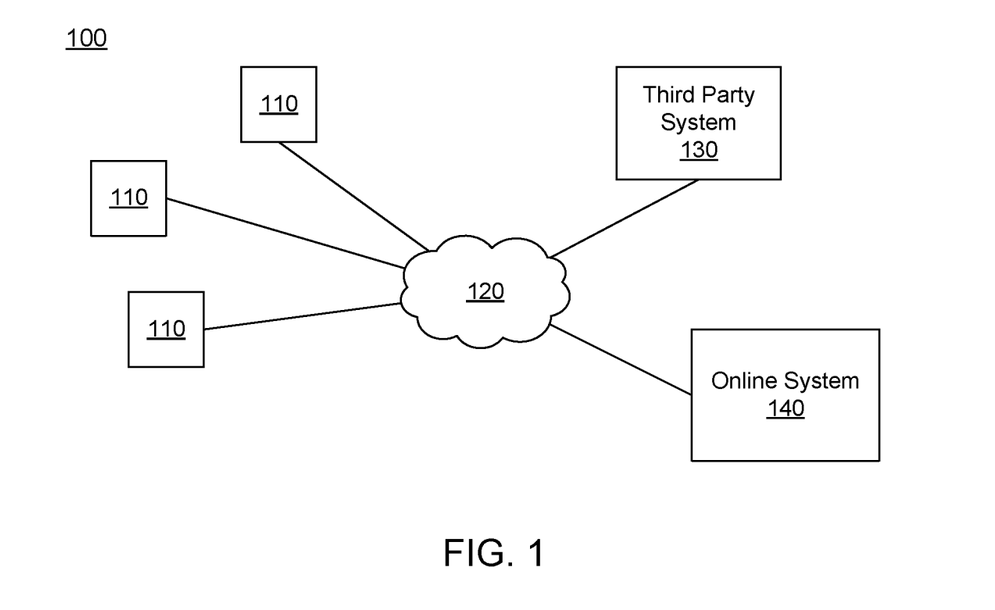
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
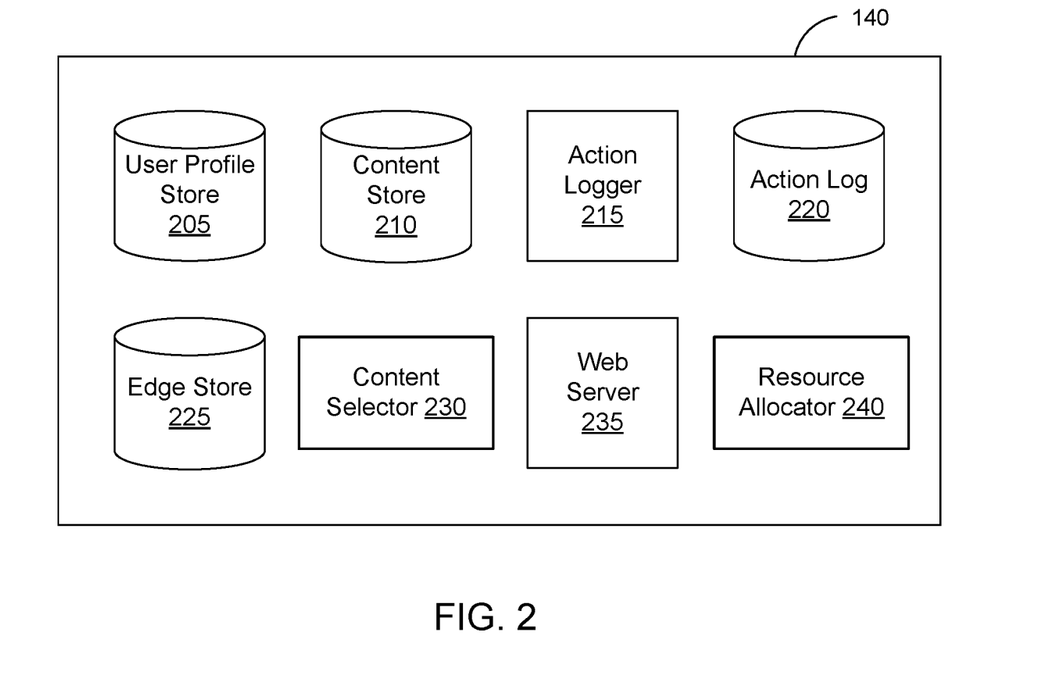
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a resource allocator 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments, which is discussed in further detail with regard to the content selector 230 and the resource allocator 240. For example, the online system 140 may identify a title and an image from a content item and provide the title and the image for presentation rather than the content item in its entirety.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selector 230 selects one or more content items for communication to a client device 110 to be presented to a user. Content items eligible for presentation to the user are retrieved from the content store 210 or from another source by the content selector 230, which selects one or more of the content items for presentation to the viewing user. A content item eligible for presentation to the user is a content item associated with at least a threshold number of targeting criteria satisfied by characteristics of the user or is a content item that is not associated with targeting criteria.

In various embodiments, the content selector 230 includes content items eligible for presentation to the user in one or more selection processes, which identify a set of content items for presentation to the user. For example, the content selector determines measures of relevance of various content items to the user based on characteristics associated with the user by the online system 140 and based on the user's affinity for different content items. Based on the measures of relevance, the content selector 230 selects content items for presentation to the user. As an additional example, the content selector 230 selects content items having the highest measures of relevance or having at least a threshold measure of relevance for presentation to the user. Alternatively, the content selector 230 ranks content items based on their associated measures of relevance and selects content items having the highest positions in the ranking or having at least a threshold position in the ranking for presentation to the user. In an embodiment, the content selector 230 and the resource allocator 240 operate together to select content items, as described in further detail with regard to FIG. 3 below.

Content items eligible for presentation to the user may include content items associated with bid amounts. The content selector 230 uses the bid amounts associated with ad requests when selecting content for presentation to the user.

In various embodiments, the content selector 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the ad request's bid amount and a likelihood of the user interacting with the content item. The content selector 230 may rank content items based on their associated bid amounts and select content items having at least a threshold position in the ranking for presentation to the user. In some embodiments, the content selector 230 ranks both content items not associated with bid amounts and content items associated with bid amounts in a unified ranking based on bid amounts and measures of relevance associated with content items. Based on the unified ranking, the content selector 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety. The expected value of a content item is a measurement of a value metric. As described supra the value metric can be based on bid amounts and likelihood of user interaction, for example, effective cost per mille (eCPM). In other embodiments the value metric may be based on other factors, such as cost per mille (CPM).

For example, the content selector 230 receives a request to present a feed of content to a user of the online system 140. The feed may include one or more content items associated with bid amounts and other content items, such as stories describing actions associated with other online system users connected to the user, which are not associated with bid amounts. The content selector 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selector 230 and/or resource allocator 240 to identify candidate content items eligible for presentation to the user. For example, content items associated with users who are not connected to the user or stories associated with users for whom the user has less than a threshold affinity are discarded as candidate content items. Based on various criteria, the content selector 230 and/or resource allocator 240 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selector 230 presents content to a user through a newsfeed including a plurality of content items selected for presentation to the user. One or more content items may also be included in the feed. The content selector 230 may also determine the order in which selected content items are presented via the feed. For example, the content selector 230 orders content items in the feed based on likelihoods of the user interacting with various content items.

The resource allocator 240 allocates computing resources for use by the content selector 230 to select content items for presentation to the user. Depending upon the embodiment, the content selector 230 or resource allocator 240 may wholly perform the functions of the other, in which case the other may not be present in the system. In other embodiments, the content selector 230 and/or resource allocator 240 perform functions described in relation to the other herein, and may perform more or less functions than described herein.

Selecting a content item for presentation to a user is an action which requires the system performing the selection to use computing resources. The system has a finite amount of computing resources for the execution of instructions for actions such as selecting content items. Computing resources may comprise one or more computer processors. Executable instructions require a certain amount of usage of a computer processor. Computing resources may comprise space upon random access memory (RAM) or other electronic storage mediums such as hard drives. Other examples of computing resources include network throughput, input and/or output operability, and electrical power. Depending upon the embodiment, one or more of the above exemplary computing resources may comprise the computing resources used in the selection process. The various computing resources described herein are not intended to be an exhaustive account. Persons skilled in the relevant art can appreciate that others are possible in light of this disclosure. In an embodiment, execution of actions requires a certain number of processor clock cycles, which may be performed by one processor, or by splitting the execution among two or more processors.

Selection of content items for presentation may be done using a selection model which requires use of computing resources. There can be a plurality of models, each of varying effectiveness with regard to selecting the best eligible content item, such as the most valuable content item for a given instance of selection. Generally, models better at selecting content items for presentation require more computing resources to execute due to an increased complexity of the model. Furthermore, allowing a model to use more computing resources to execute the selection generally enables the model to select a better content item, whereas allowing the model to use fewer computing resources generally leads to the selection of a worse content item. For example, a model which is able to select from ten thousand content items and has one second to make the selection selects a more valuable content item than if it were able to select from one hundred content items with ten milliseconds to execute.

An impression opportunity is a chance to present one or more content items to a specific user of the online system 140. For example, an impression opportunity is a portion of the feed of content of the user within which a content item comprising an image can be displayed. Selection of a content item for presentation is reliant upon impression opportunities, in that content items selected for presentation are presented at impression opportunities; content items are selected responsive to impression opportunities arising. The online system 140 selects content items for presentation at impression opportunities one or more times for each user of the online system 140, and may encounter situations where there are more impression opportunities which require content item selection than there are computing resources to perform those selections using the most resource intensive selection model. In such situations the online system 140 allocates resources such that as many impression opportunities may have content items selected for presentation as possible using as best an allocation of computing resources among selection models as possible, to maximize value. Such an allocation is determined by the online system 140, for example, by the resource allocator 240 as further detailed with reference to FIG. 3.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Figure 3:
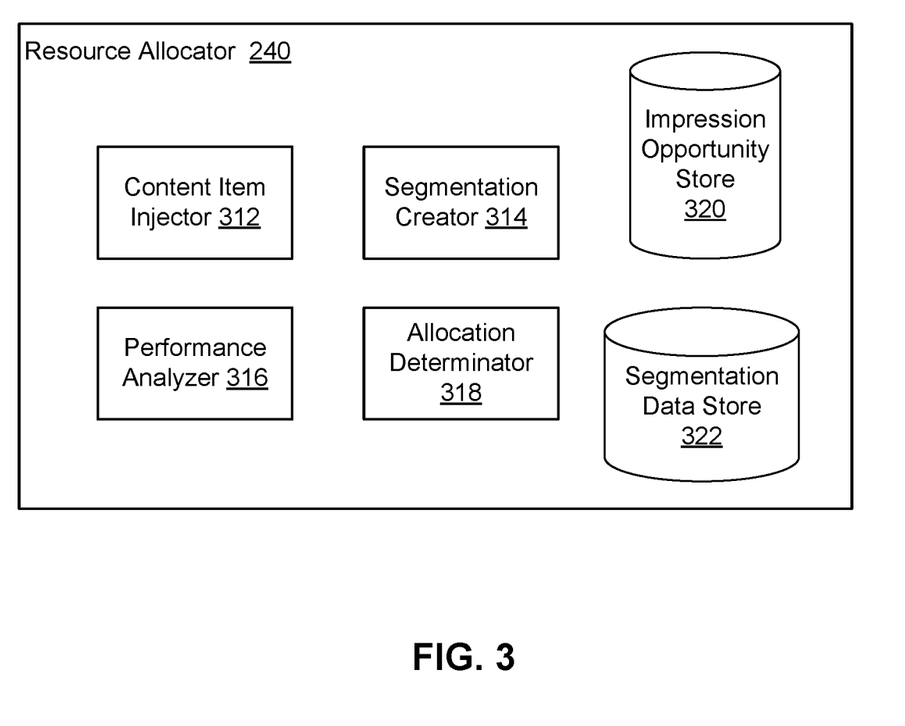
FIG. 3 is a block diagram of a resource allocator, in accordance with an embodiment.

FIG. 3 is a block diagram of a resource allocator 240, in accordance with an embodiment. The resource allocator 240 comprises a content item injector 312, a segmentation creator 314, a performance analyzer 316, an allocation determinator 318, an impression opportunity store 320, and a segmentation data store 322. The resource allocator 240 is used to determine which model or models shall be used to select content items for impression opportunities and how many computing resources each selection is allowed to consume.

The content item injector 312 communicates with client devices 110 to manage impression opportunities and data pertaining to those impression opportunities, and also manages the presentation of content items selected for the impression opportunities. For example, the content item injector 312 identifies an impression opportunity and data pertaining to it, which is recorded in the impression opportunity store 320. After a content item is selected for the impression opportunity, the content item injector 312 communicates the content item to the relevant client device 110 for presentation to the user. The content item injector 312 can also receive data pertaining to the results of an impression opportunity, such as whether or not a user, for example, viewed a video which was selected for presentation at the impression opportunity. Upon receipt of result data, the content item injector 312 sends it to the performance analyzer 316 for analysis.

The segmentation creator 314 segments impression opportunities according to one or more characteristics of the user associated with the impression opportunity, the content item or items associated with the impression opportunity, and/or the impression opportunity itself. The plurality of impression opportunities requiring selection of content items each requires use of computing resources to execute the selection. A naive approach is to allocate computing resources equally among the plurality of impression opportunities, or, at least, within a threshold amount of each other. However, by analyzing relationships between computing resource allocations and value metrics per impression opportunity segment, it is possible to identify possible allocations of computing resources among segments which increase resultant value. For example, if increasing computing resources dedicated to the selection process for a first segment increases value more than decreasing computing resources for a second segment decreases value, then allocating more computing resources to the impression opportunities of the first segment would increase overall value returned from the impression opportunities as a whole. For example, if content items selected for impression opportunities include a bid amount, then intelligent allocation of computing resources can increase revenue earned from the content items presented at impression opportunities, where the value metric is monetary, such as eCPM. Achieving the same marginal rate of value metric per computing resources used for each segment maximizes value overall to the system.

Upon creation of segments, data pertaining to them, such as what the segments are, which impression opportunities are in each segment, and measured relationships between computing resource allocations and value metrics, may be stored in the segmentation data store 322. Impression opportunities may be segmented in a variety of ways. Segmenting impression opportunities according to characteristics of the associated user may comprise segments determined by geography, such as city, state, country, continent, and so on. In other embodiments, user characteristics used to segment impression opportunities comprise gender, age, income, and/or other demographics of the users. Multiple characteristics may be used to segment impression opportunities as well.

For example, there may be two segments, one comprising impression opportunities for users who reside in the United States, and one comprising users who do not reside in the United States. Each segment will have its own relationship between a value metric and computing resources used for selection of content items. Such relationships may be determined over time, or may be determined based on previous data recorded for previous impression opportunities. To further the example, a separate segmentation may be created where there are four segments. A first segment is women residing in the United States, a second is men residing in the United States, a third is women residing outside the United States, and a fourth is men residing outside the United States. By segmenting using multiple characteristics, it may be possible to better refine computing resource allocation to better maximize value.

It is also possible to segment impression opportunities various ways based on individual characteristics. For example, if segmenting by income, it is possible to create any number of income brackets to use for segmentation. In one embodiment there could be two segments, one for impression opportunities for users who make less than $50,000 a year, and another for impression opportunities for users who make at least $50,000 a year. In a second embodiment there could be a plurality of segments with brackets corresponding to $10,000 increments, i.e., from $0 to $9,999, then $10,000 to $19,999, then $20,000 to $29,999, and so on.

In an embodiment, the impression opportunities are segmented by user, wherein the collective impression opportunities of each user are in their own segment.

Segmentation is also possible for characteristics of the impression opportunities themselves, such as by the context of the impression opportunity. Impression opportunities can have types of content for which they are appropriate, and therefore may be segmented by type. For example, one segment may comprise impression opportunities to be placed in a web banner, while another segment comprises impression opportunities to be placed within a newsfeed.

Segmentation is furthermore possible for characteristics of content items in embodiments where impression opportunities are for specific types of content. For example, a first segment may comprise impression opportunities for content items related to video games, and a second segment may comprise impression opportunities for content items related to apparel.

It is possible to use characteristics of different kinds to segment, for example, characteristics of users and characteristics of content items. For a specific example, there may be four segments, a first segment comprising impression opportunities for male users for content items related to apparel, a second segment comprising impression opportunities for female users for content items related to apparel, a third segment comprising impression opportunities for male users for content items related to video games, and a fourth segment comprising impression opportunities for female users for content items related to video games.

The performance analyzer 316 analyzes the performance of content items selected for impression opportunities according to one or more value metrics. Such analyses are used to construct representations indicating the relationships between value metrics and computing resources allocated, for each segment. The performance of content items is determined using data ingested by the content item injector 312, the data indicating features of user interactions, or lack thereof, with content items. For example, performance data may indicate whether or not a user watched a video, clicked a link, and/or otherwise interacted with a content item. Such actions may determine whether or not a bid amount of the content item is earned as revenue by the online system. When the value metric used to measure performance is monetary, it is important for bid amounts to be earned; if a bid amount is not earned, the impression opportunity results in no value gained. Results of the analyses done by the performance analyzer 316 can be stored in the segmentation data store 322 and are used by the allocation determinator 318 in determining computing resource allocations among segments of a particular segmentation. The online system 140 determines which segmentation to use, for example, the segmentation which best maximizes value returned from impression opportunities based on the allocation of resources determined from analysis of the segmentation.

The allocation determinator 318 is used to improve computing resource allocation per impression opportunity for executing a selection model to select a content item for presentation. The allocation determinator 318 determines an optimal allocation per segment of a segmentation based on analysis of the relationships between computing resources allocated and subsequent changes in value metrics. The ideal optimization is one where the rate of each segment's change in value per computing resources used is equal. That is to say, an allocation of computing resources where each segment has the same marginal value per computing resources used rate. By achieving equal rates, computing resources are balanced such that the increased value gained by adding computing resources to impression opportunities of one segment would result in a mirroring decrease in value from removing those computing resources from one of the other segments. As such, such an allocation is optimized, since there is no possible reallocation which increases performance. Rates may be considered equal if they are within a threshold amount of each other.

In some embodiments the optimal allocation of computing resources would require more computing resources than there are available. In such embodiments, the allocation determinator 318 allocates computing resources such as to approximate the optimal allocation as closely as possible in a way which maximizes value returned by the impression opportunities as constrained by the amount of computing resources of the online system 140.

In some embodiments there are minimum amounts of computing resources per impression opportunity, which the allocation determinator 318 is configured to enforce. In such embodiments the allocation determinator 318 allocates within the constraints of these minimum amounts. These constraints may be in place to ensure all impression opportunities have a content item selected, such as in cases where the optimal allocation would set one segment's amount of allocated computing resources to, or close to, none.

Allocations of computing resources per impression opportunity may be changed in a variety of ways. In some embodiments, a time limit is set within which a content item must be selected. The online system 140 dedicates its computing resources to evaluating as many candidate content items as it can within the time limit. Alternatively, in some embodiments, a maximum number of candidate items to be evaluated may be determined by the allocation determinator 318 and the online system 140 is only allowed to evaluate up to the maximum number before selecting a content item for presentation. In other embodiments, both a time limit and a maximum number may be set. In some embodiments, where there are a plurality of selection models of varying complexity, the allocation determinator 318 sets which model is used. Setting a model may be additional to setting a time limit and a maximum number, for example. Persons skilled in the relevant art can appreciate that many variations are possible regarding the allocation of computing resources.

Process to Allocate Computing Resources

Figure 4:
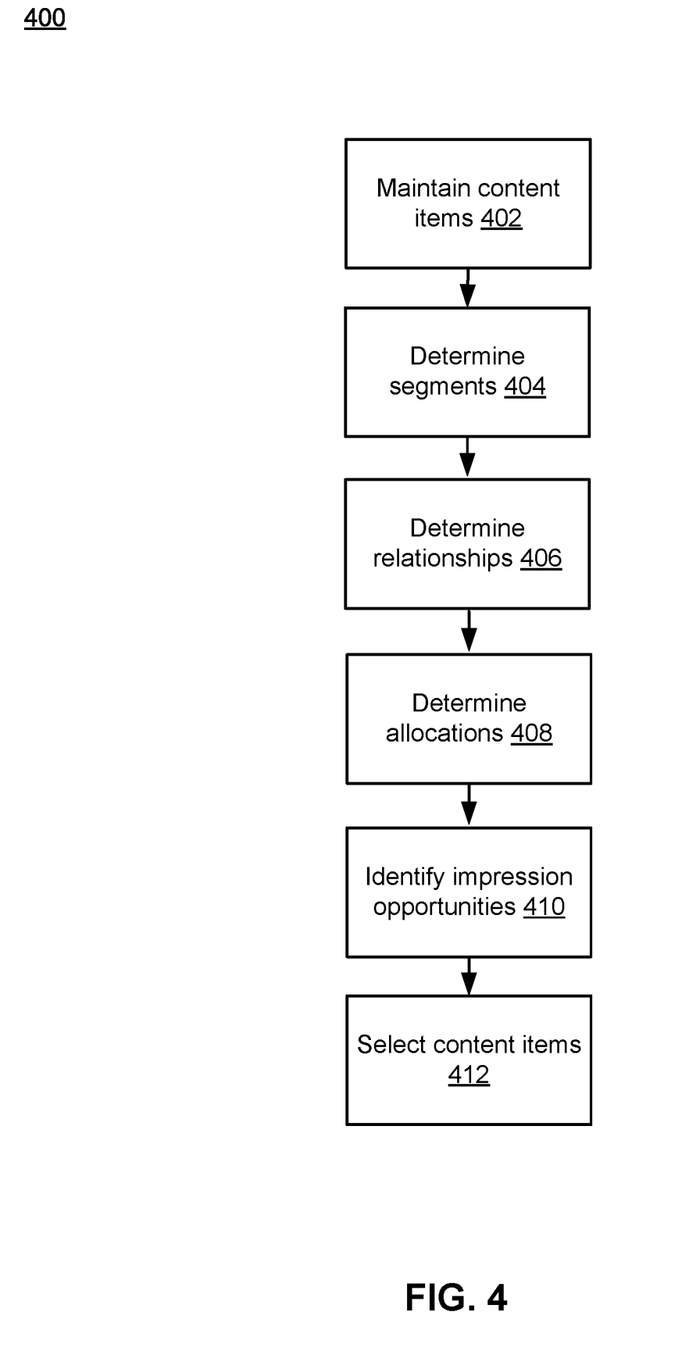
FIG. 4 shows the process of allocating computing resources, in accordance with an embodiment.

FIG. 4 shows the process of allocating computing resources, in accordance with an embodiment. The online system 140 maintains 402 a plurality of content items, where the online system selects and provides content items to users of the online system in response to impression opportunities to provide content items to the users. The content items are stored in the content store 210 and comprise data such as images and videos which the user may find desirable to consume. Each content item has an associated value as measured by a value metric, such as eCPM.

The online system 140 determines 404 a plurality of segments of the impression opportunities. Each segment categorizes the impression opportunities based on at least one characteristic of the user associated with the impression opportunity, the content item associated with the impression opportunity, and the impression opportunity itself. Impression opportunities are categorized into at least one segment.

The online system 140 determines 406, for each segment, a relationship between the value metric and computing resources used when selecting content items for impression opportunities of the segment. Each relationship provides a rate of increase of the value metric given an increase in computing resources used for the impression opportunities.

The online system 140 determines 408 an allocation of computing resources used per impression opportunity for each of the segments based on the determined relationships. Typically such an allocation is done to maximize value returned by the impression opportunities. In embodiments where the most optimal allocation is not feasible, as close an approximation as possible is typically determined.

The online system 140 identifies 410 a plurality of impression opportunities for the online system 140 to provide one or more content items to users of the online system 140. Each of the identified impression opportunities is capable of being categorized into one of the segments determined 404 by the online system 140.

The online system 140 selects 412 one or more content items for the users of the online system 140 by using computing resources for each impression opportunity according to the determined allocation for the segment to which each impression opportunity belongs.

In some embodiments, the selected content items are presented to the user, such as on a display of a client device 110. User interactions with the content items may be recorded by the online system 140 for future use in determining allocations of computing resources.

Graph Illustrations of Allocating Computing Resources

Figure 5A:
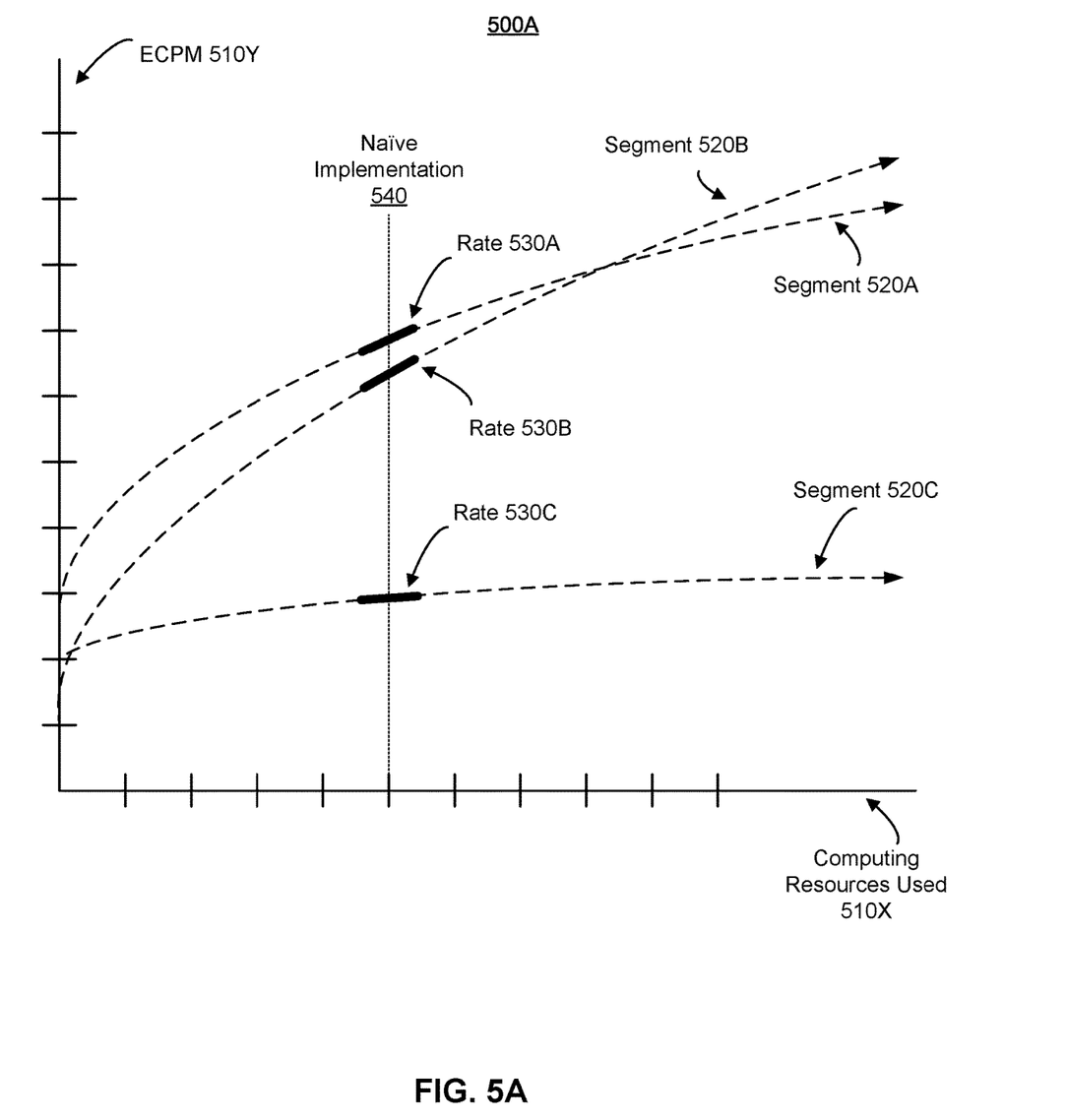
FIG. 5A illustrates a graph representing a simplified example of allocating computing resources naively, in accordance with an embodiment.
Figure 5B:
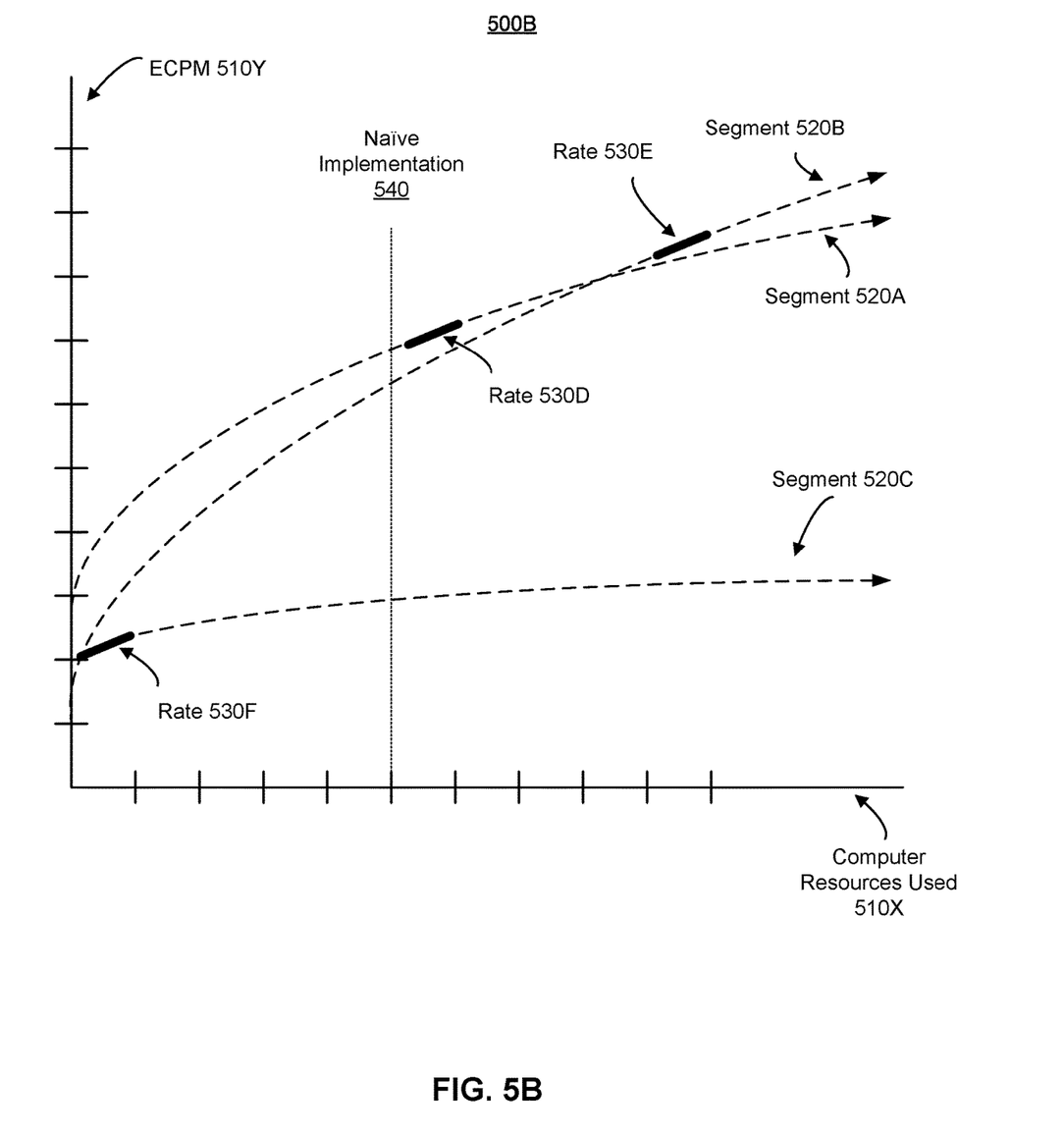
FIG. 5B illustrates a graph representing a simplified example of allocating computing resources intelligently, in accordance with an embodiment.

FIGS. 5A and 5B illustrate graphs 500A and 500B representing simplified examples of allocating computing resources. The vertical axis 510Y is a projection of eCPM, which for this example is the value metric used for determining value. The horizontal axis 510X is a projection of computing resources used. Exact values are not necessary to express the relationships between the value metric and the computing resources used, nor to compare relationships with one another. As such, for the sake of greater understandability, exact values have not been used on either graph.

FIG. 5A illustrates a graph 500A representing a simplified example of allocating computing resources naively, in accordance with an embodiment. Naive with regard to computing resource allocation means an equal or close to equal division of computing resources among impression opportunities regardless of the relative value which could be derived from those impression opportunities. The naive implementation 540 shown on the graph 500A has an equal allocation of computing resources among segment 520A, segment 520B, and segment 520C. This means if there are an equal number of impression opportunities in each segment then each segment 520 would be allocated one third of the computing resources for selecting content items.

Rate 530A, rate 530B, and rate 530C show the rate of value metric increase per computing resources used at the naïve implementation. Each rate 530 is the slope of each segment 520 line at the naïve implementation point. As shown on the graph 500A, the rates are not equal. Rate 530B is greater than rate 530A which is greater than rate 530C. As such, if a segment with a greater rate were to have more computing resources allocated, and a segment with a lesser rate were to have fewer computing resources allocated, then the overall value would increase. This is due to the relative rates; the segment with a greater rate would gain value more quickly than the segment with the lesser rate would lose value. For example, if segment 520B were to have more computing resources allocated, and segment 530C were to have fewer computing resources allocated, the eCPM 510Y of segment 520B would increase more than the eCPM 510Y of segment 520C would decrease.

FIG. 5B illustrates a graph 500B representing a simplified example of allocating computing resources intelligently, in accordance with an embodiment. Intelligent with regard to computing resource allocation means an optimized allocation which maximizes revenue within the constraints of the system. The allocation shown on the graph 500B has unequal allocations of computing resources among the segments 520. As seen on the graph 500B, the segments 520 are the same as on graph 500A, but with different allocations of computing resources 510X and, respectively, different rates 530. Segments 520A and 520B have been allocated additional computing resources, while segment 520C has been allocated fewer resources. Due to this reallocation rates 530D, 530E, and 530F are equal. This is an optimal allocation because it maximizes value. Because the rates 530 of graph 500B are equal, the increase in value gained by increasing the computing resources allocated to one segment 520 results in a matching decrease in value because of the necessary decreasing of computing resources for the other segments 520. At this intelligent allocation, because there is no way to increase value, the allocation of computing resources has been optimized and value has been maximized.

The examples of FIG. 5 are simplified. There can be more or fewer segments than those shown in FIG. 5. Furthermore, in other embodiments, the value metric may be other than eCPM, and computing resources can be specified, for example, as runtime on a processor.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
maintaining a plurality of content items by an online system, where the online system selects and provides content items to users of the online system in response to impression opportunities to provide content items to the users;
determining a plurality of segments of the impression opportunities, where each segment categorizes the impression opportunities based on at least one characteristic of at least one of: the user associated with the impression opportunity, the content item associated with the impression opportunity, and the impression opportunity itself;
for each of the plurality of segments, determining a relationship between a value metric and computing resources used in the selection process for the impression opportunities of the segment, where each relationship provides a rate of increase of the value metric given an increase in computing resources used for the impression opportunities of each segment;
determining an allocation of computing resources used per impression opportunity for each of the plurality of segments based on the rates of increase for the segments at the allocated computing resources used;
identifying a plurality of impression opportunities for the online system to provide one or more of the content items to the users of the online system; and
in response to the impression opportunities, selecting one or more content items for the users of the online system by using the computing resources for each impression opportunity according to the determined allocation for the segment to which each impression opportunity belongs.

2. The method of claim 1, wherein determining an allocation of computing resources used per impression opportunity for each of the plurality of segments based on the rates of increase for the segments at the allocated computing resources used further comprises:
determining, for each segment, a time limit on use of computing resources per impression opportunity.

3. The method of claim 1, wherein determining the allocation of computing resources comprises determining the computing resources used for each segment where the rates for all segments are within a threshold amount of each other.

4. The method of claim 1, wherein the one or more characteristics upon which determining the plurality of segments is based comprise a geographical location.

5. The method of claim 1, wherein the one or more characteristics upon which determining the plurality of segments is based comprise a user demographic.

6. The method of claim 1, wherein determining an allocation of computing resources used per impression opportunity for each of the plurality of segments based on the rates of increase for the segments at the allocated computing resources used further comprises:
determining, for each segment, a maximum number of content items to select from per impression opportunity.

7. The method of claim 1, wherein determining an allocation of computing resources used per impression opportunity for each of the plurality of segments based on the rates of increase for the segments at the allocated computing resources used further comprises:

determining, for each segment, one of a plurality of selection models for selecting one or more content items.

8. The method of claim 1, wherein selecting a first content item for a first impression opportunity comprises:

determining one or more features of the impression opportunity;

identifying a plurality of content items;

analyzing one or more features of each of the plurality of content items to determine a relevance score, wherein a higher relevance score corresponds with greater relevance to the impression opportunity;

ranking the plurality of content items using the relevance score associated with each content item; and selecting the highest ranked content item for the impression opportunity.

9. A method comprising:

receiving a plurality of impression opportunities at an online system, where each impression opportunity comprises an opportunity to provide a content item from a plurality of content items to a user of a plurality of users of the online system;

in a selection process to provide one or more of the plurality of content items in response to each impression opportunity, using computing resources of the online system based on an initial allocation of computing resources used per impression opportunity;

determining a plurality of segments, where each segment categorizes impression opportunities based on at least one characteristic of at least one of: the user associated with the impression opportunity, the content item associated with the impression opportunity, and the impression opportunity itself;

for each of the plurality of segments, determining a relationship between a value metric and the computing resources used in the selection process for the impression opportunities of the segment, where each relationship provides a rate of increase of the value metric given an increase in computing resources used for the impression opportunities of each segment;

determining an updated allocation of computing resources used per impression opportunity for each of the segments, where the rate of increase of at least one of the segments is closer to the rates of the other segments in the updated allocation than for the initial allocation;

identifying a plurality of impression opportunities for the online system to provide one or more of the content items to the users of the online system; and in response to the impression opportunities, selecting one or more content items for the users of the online system by using the computing resources for each impression opportunity according to the updated allocation for the segment to which each impression opportunity belongs.

10. The method of claim 9, wherein determining the allocation of computing resources comprises determining the computing resources used for each segment where the rates for all segments are within a threshold amount of each other.

11. The method of claim 9, wherein the one or more characteristics upon which determining the plurality of segments is based comprise a user demographic.

12. The method of claim 9 wherein determining an updated allocation of computing resources used per impression opportunity for each of the segments further comprises:

determining, for each segment, a time limit on use of computing resources per impression opportunity.

13. The method of claim 9 wherein determining an updated allocation of computing resources used per impression opportunity for each of the segments further comprises:

determining, for each segment, a maximum number of content items to select from per impression opportunity.

14. The method of claim 9, wherein selecting a first content item for a first impression opportunity comprises:

determining one or more features of the impression opportunity;

identifying a plurality of content items;

analyzing one or more features of each of the plurality of content items to determine a relevance score, wherein a higher relevance score corresponds with greater relevance to the impression opportunity;

ranking the plurality of content items using the relevance score associated with each content item; and selecting the highest ranked content item for the impression opportunity.

15. A method comprising:

maintaining a plurality of content items by an online system, where the online system provides the content items to users of the online system in response to impression opportunities to provide content items to the users;

determining a plurality of segments of the impression opportunities, where each segment categorizes the impression opportunities based on a characteristic of at least one of the user and the content item associated with the impression opportunity;

for each of the plurality of segments, determining a relationship between a value metric and the computing resources used in the selection process for the impression opportunities of the segment, where each relationship provides a rate of increase of the value metric given an increase in computing resources used for the impression opportunities of each segment;

a step for optimally allocating computing resources used per impression opportunity for each of the plurality of segments;

identifying a plurality of impression opportunities for the online system to provide one or more of the content items to the users of the online system; and in response to the impression opportunities, selecting one or more content items for the users of the online system by using the computing resources for each impression opportunity according to the allocated computing resources for the segment to which each impression opportunity belongs.

16. The method of claim 15, wherein the step for optimally allocating comprises determining the computing resources used for each segment where the rates for all segments are within a threshold amount of each other.

17. The method of claim 15, wherein the one or more characteristics upon which determining the plurality of segments is based comprise a user demographic.

18. The method of claim 15 wherein the step for optimally allocating computing resources used per impression opportunity for each of the plurality of segments further comprises:

determining, for each segment, a time limit on use of computing resources per impression opportunity.

19. The method of claim 15 wherein the step for optimally allocating computing resources used per impression opportunity for each of the plurality of segments further comprises:

determining, for each segment, a maximum number of content items to select from per impression opportunity.

20. The method of claim 15, wherein selecting a first content item for a first impression opportunity comprises:

determining one or more features of the impression opportunity;

identifying a plurality of content items;

analyzing one or more features of each of the plurality of content items to determine a relevance score, wherein a higher relevance score corresponds with greater relevance to the impression opportunity;

ranking the plurality of content items using the relevance score associated with each content item; and     selecting the highest ranked content item for the impression opportunity.

\* \* \* \* \*